INVENTOR
WILLIAM A. FORRESTER

BY *Wilmer Mechlin*

ATTORNEY

Nov. 10, 1959  W. A. FORRESTER  2,912,215
AUTOMATIC VALVE

Filed April 22, 1957  2 Sheets-Sheet 2

INVENTOR
WILLIAM A. FORRESTER

BY *Wilmer Mechlin*

ATTORNEY

United States Patent Office 2,912,215
Patented Nov. 10, 1959

2,912,215

AUTOMATIC VALVE

William A. Forrester, Columbus, Nebr., assignor to Universal Metals Company, Columbus, Nebr., a corporation of Nebraska Application April 22, 1957, Serial No. 654,319

14 Claims. (Cl. 251—13)

This invention relates to automatic valves and particularly to a valve for periodically interrupting the flow of a fluid which is operated automatically by the pressure of the fluid.

The periodic or intermittent interruption of the flow of a fluid has many applications and, where automatic, generally is accomplished by a valve operating mechanism which is powered independently of the fluid by an electrical or other external power source. Although mechanisms so powered ordinarily are satisfactory, there are numerous applications in which the difficulty of supplying power to a valve site may outweigh the advantage of automatic operation.

A typical application of an intermittently flowing fluid is in irrigation. Since soils vary widely in their absorption rates, water should be applied at a rate determined by the absorption characteristics of the soil being irrigated and most efficiently is applied by intermittently interrupting the flow for a period sufficient to enable the soil to absorb the applied water and thus avoid the waste and run-off usually resulting from continuous application. Such alternate application and absorption is of advantage whether the water is discharged into rills or furrows or applied through sprinklers, it being most efficient in the one case to fill the rills to the end of the run and allow this water to be absorbed before the rills are refilled and in the other to avoid the practically impossible task of regulating the rate of application by the sprinklers exactly to the absorption rate of the soil. Due to the difficulty of supplying and maintaining power from an independent source at a valve site, the desired intermittent flow in irrigation systems customarily is obtained by manually operated valves. However, the advantages of automatic operation, if obtainable without dependence upon an external source of power, are obvious.

It is the primary object of the present invention to provide an improved automatic valve for periodically regulating or interrupting flow of a fluid which is operated by the pressure of the fluid being regulated without dependence upon a separate power source.

Another object of the invention is to provide an automatic valve operated by the pressure of the fluid whose flow it regulates and settable for timing by fluid pressure the periods of flow and non-flow, whereby a given valve may be adapted for various operating conditions.

Another object of the invention is to provide an improved valve operating mechanism for an automatic valve whereby the pressure of the fluid regulated by the valve is employed to open and close the valve for intervals predetermined by the setting of an in-built fluid pressure timing device.

An additional object of the invention is to provide an improved valve operating mechanism for automatically operating a butterfly valve to regulate flow of a fluid, the mechanism producing reciprocable movement at a controlled rate under the pressure of the fluid regulated by the valve and having a regulation cycle predetermined by the setting of an in-built fluid pressure timing device.

A further object of the invention is to provide an automatic valve for regulating flow of a fluid which is relatively simple and rugged in construction, independent of a separate power source and both operable at any desired location and practically trouble-free in operation.

Other objects and advantages of the invention will appear hereinafter in the detailed description, be particularly pointed out in the appended claims and be illustrated in the accompanying drawings, in which:

Figure 1:
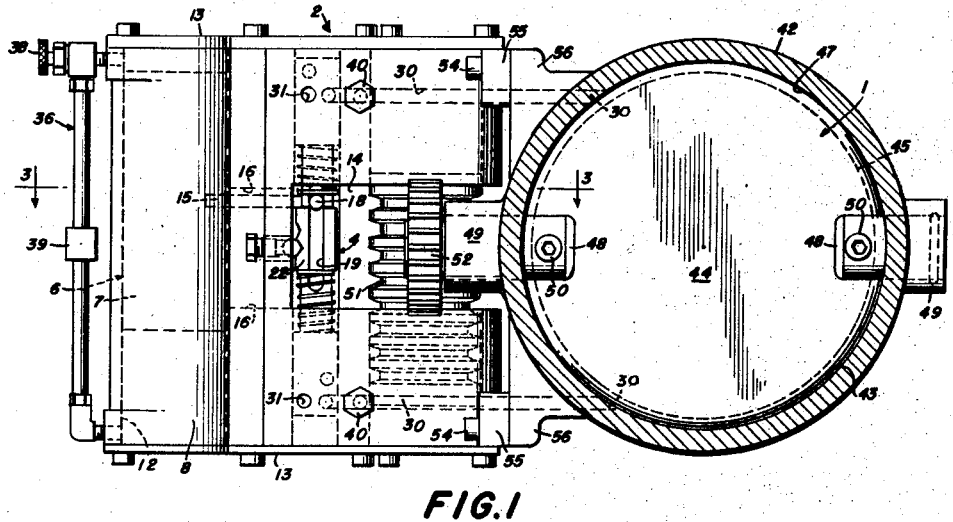
Figure 1 is a side elevational view of a preferred embodiment of the automatic valve of the present invention.
Figure 2:
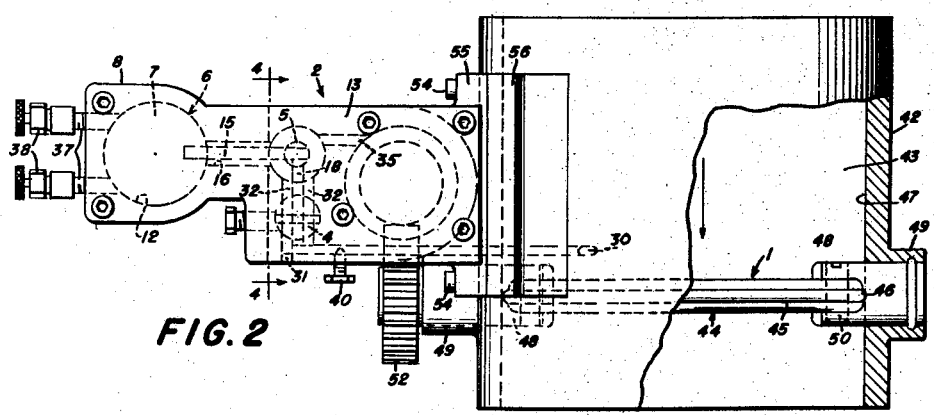
Figure 2 is a plan view of the structure of Figure 1.
Figure 3:
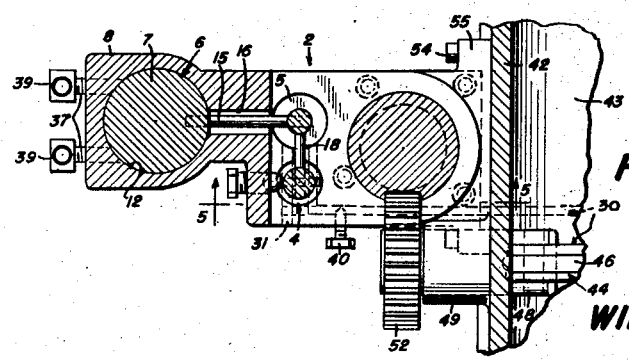
Figure 3 is a fragmentary horizontal sectional view taken along the lines 3—3 of Figure 1.
Figure 4:
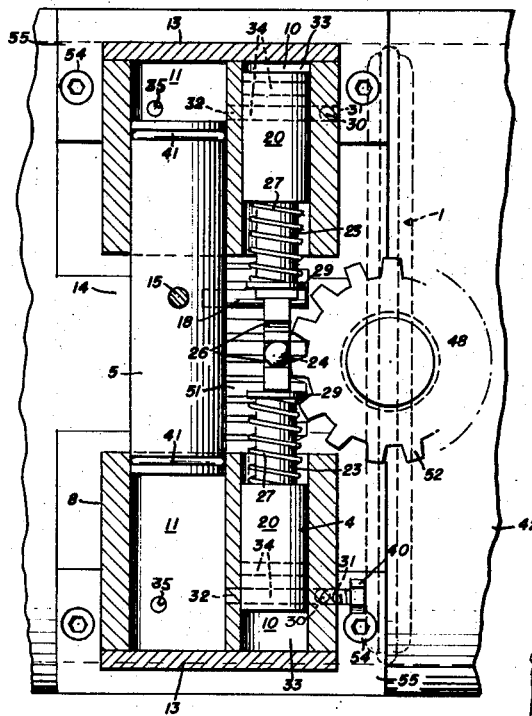
Figure 4 is a fragmentary vertical sectional view on an enlarged scale taken along the lines 4—4 of Figure 2.
Figure 5:
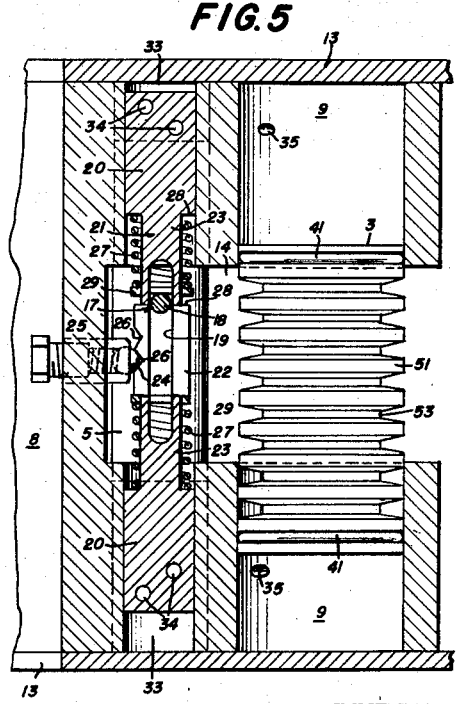
Figure 5 is a fragmentary vertical sectional view on the scale of Figure 4 taken along the lines 5—5 of Figure 3.

Referring now in detail to the drawings, in which like reference characters designate like parts, the improved automatic valve of the present invention, while capable of regulating flow of a fluid by either a rotatable or a reciprocable valve element, is particularly designed to incorporate a rotary valve for cyclically cutting on and off the flow of water or other fluid.

The automatic valve of this invention is comprised of a valve 1 for regulating or controlling the flow of water or other fluid through an irrigation or other pipe or conduit (not shown) and a mechanism 2, responsive to the pressure of the fluid, for automatically operating the valve 1. Essentially, the valve operating mechanism 3 is designed to convert the pressure or force of the fluid into timed mechanical movement and transmit this movement to the valve 1 to operate the latter so as to interrupt or restrict flow of the fluid for a predetermined interval.

The principal components of the valve operating mechanism 2 are an actuating element 3 which is reversible, movable or shiftable in a fixed path by the pressure of the fluid, a pilot valve 4 for determining the direction in which the actuating element 3 will move, a shifting or loading element 5, also subjected to the pressure of the fluid, for shifting, switching or changing the position or setting of the pilot valve 4, and a fluid pressure timing device 6, having an element 7 movable with the shifting element 6 for timing the shifting or upsetting of the pilot valve 4 thereby. In the preferred form of the operating mechanism 2, the pilot valve 4 is a slide valve, the several elements 3, 5 and 7 are pistons and the slide valve 4 and pistons reciprocate, each in one of a plurality of continuous or uninterrupted cylinders disposed in spaced substantially parallel relation in and extending through a housing or cylinder block 8 of multi- or, as shown, one-part construction.

Designated as 9 for the actuating piston 3, 10 for the slide valve 4, 11 for the shifting piston 5 and 12 for the timing element 7, the several cylinders are closed at their opposite ends by end plates 13, which, if the housing 8 is of multi-part construction, may serve to connect or hold the parts together.

Of the several cylinders in the housing 8, the cylinders 9, 10 and 11 of the actuating piston 3, slide valve 4 and shifting piston 5, respectively, preferably are interrupted intermediate their ends by a recess or cavity 14 extending transversely through the housing 8 toward one side thereof. The purpose of this cavity 14 is to facilitate mechanical connection of the actuating piston 3 to the control valve 1 and of certain of the other components of the operating mechanism 2 to each other. As mentioned, two of the elements, the shifting piston 5 and the timing piston 7, are connected or coupled for movement in unison, this conveniently being accomplished by a rod or like rigid means 15 clamped or otherwise fixed or secured to the portion of the shifting piston 5 exposed by the recess 14. Secured to the shifting piston substantially midway of its ends, the rod 15 extends radially therefrom through an aperture 16 in the housing 8 to the timing piston 7 and is threaded into or otherwise fixed or secured to the timing piston substantially midway of the latter's ends. To avoid interference with the rod 15, the aperture 16, through which it extends, is elongated sufficiently to accommodate the range of axial or reciprocable movement of the shifting and timing pistons 5 and 7.

The shifting piston 5 also is connected to the slide valve 4, in this case by a lost motion or pin and slot connection 17. The pin 18 of this connection 17 is carried by and projects radially from the shifting piston 5, being fixed or secured thereto substantially in the plane of and at an angle to the rod 15. The slot 19 of the connection 17 in which the pin 18 slides or rides is formed in and extends axially of the slide valve 4. In its preferred form, the slide valve 4 has a pair of axially spaced heads 20, each serving as a slide valve, the heads 20 being rigidly connected to opposite ends of a common stem 21 in which the slot 19 actually is formed. Exposed by the recess 14 in the housing 8, the stem 21 has a central portion 22 of substantially block-shape and outer or neck portions 23 extending from its opposite ends to the heads 20 and restricted in cross-section relative to both the central portion and the heads.

The purpose of the lost motion connection 17 is to enable the shifting piston 5, as it moves in one direction or the other to shift the slide valve 4 in the same direction after the pin 18 has moved a predetermined distance in the slot 19. As will appear hereinafter, the slide valve 4 has two positions from one to the other of which it is shifted by the shifting piston 5, the slide valve conveniently being held in each position between shifts by a spring-pressed ball or like yieldable means 24. Projecting transversely of the stem 21, from a suitable pocket 25 in the housing 8, the ball 24 is seatable in one of a pair of notches 26 spaced longitudinally or axially of the stem 21 and formed in the side of the stem's central portion 23 which confronts the pocket 25.

Yieldably resisting axial movement of the slide valve 4, the spring-pressed ball or other yieldable means 24 may be displaced from one to the other of the notches 26 merely by engagement of the pin 18 with one end of the slot 19. However, it is preferred that the slide valve have a snap action between positions. To this end, each of the outer portions 23 of the stem 21 is relatively restricted so as to contain an encircling coil or like spring 27 which at free height extends between the shoulders 28 defining the opposite ends of each outer portion 23 and formed on the confronting ends of the heads 20 and central portion 22. As it approaches one end of the slot 19, the pin 18 of the shifting piston 5 engages the inner end of one of the springs 27, preferably through an interposed washer 29 encircling each of the outer portions between the spring and the central portion 22, and compresses that spring to the point where its potential energy is sufficient to overcome the resistance of the yieldable means 24 and snap the slide valve to its opposite or other position.

The remaining of the pistons, the actuating piston 3, is mechanically connected only to the regulating valve 1. However, the opposite ends of its cylinder 9 are fluid-connected to the corresponding ends of the cylinder 11 of the shifting piston 5 and alternately connectable through the slide valve 4 to atmosphere and to line pressure of the fluid regulated by the control valve 1, so that when one of the pairs of connected ends of the cylinders 9 and 11 is charged, the opposite pair is vented and vice versa. While the charging and venting of the ends of the cylinders 9 and 11 may be through common ports, it is preferred that each pair of connected ends have its own individual or separate intake or feed port 30, open to line pressure upstream of the control valve 1, and vent or exhaust port 31, open to atmosphere, and that each pair be connectable thereto through the adjoining or related of the pair of heads 20 with which for this reason the slide valve 4 is provided.

In accordance with the preferred construction, each of the ends of the cylinder 11 of the shifting piston 5 is directly connected by one or, desirably, a pair of transversely spaced passages 32 through the housing 8 to the valve chamber 33 of the corresponding or related of the heads 20. Opening onto the same side of the valve chamber 33, each of the passages 32 is made connectable to one of the related intake and exhaust ports 30 and 31, which open onto the other side of the chamber, through one of a pair of openings or passages 34 extending transversely through the related of the heads 20. Spaced transversely in correspondence with the spacing of the passages 32, the openings 34 are spaced axially of the head the distance between the pair of notches 26 in the stem 21. The fluid connection between the corresponding ends of the cylinders 9 and 11 may be made through a single conduit or fluid connection 35. With this arrangement one of the pairs of connected ends of the cylinders 9 and 11 will be charged in one position of the slide valve 4, driving the actuating and shifting pistons 3 and 5 in the same direction toward the opposite ends of their cylinders, and when the slide valve is shifted to its other positions, the pistons will be moved by fluid pressure in the reverse direction.

Although subjected to the same force and moving in response thereto in the same direction, the actuating and shifting pistons 3 and 5 are not designed to move at the same rate. Instead, the shifting piston is made to move at a controlled rate by coupling it in the manner previously mentioned to the timing piston 7 and dampening or retarding movement of the shifting piston by requiring the timing piston in moving to displace oil or like captive fluid through a regulatable orifice. This is accomplished by filling the ends of the cylinder 12 of the timing piston 7 with oil or like fluid and connecting the ends in a closed circuit or system by piping 36. In order that the rate of movement of the timing piston 7 in each direction may be individually regulated, it is preferred that the connecting piping 36 be a pair of pipes 37, each with its own needle valve 38 for regulating the rate of exchange or displacement of fluid between the ends of the cylinder 12 and with one of a pair of oppositely directed or facing one-way valves 39 intermediate its ends. The oil thus will flow through one of the pipes 37 on one stroke of the timing piston 7 and the other pipe on its opposite stroke and be regulatable in its rate of flow through each by the associated of the needle valves 38.

Since the rate of movement of the shifting piston 5 is exactly that of the timing piston 7, the settings of the needle valves 38 for a given line pressure will predetermine the intervals at which the shifting piston will shift the slide valve 4 and thus the periods or intervals during which the slide valve will remain in each of its two positions. The position of the slide valve in turn determining the direction of movement of the actuating piston will be timed correspondingly. It also is preferred that the rate of linear movement of the actuating piston 3 in each direction be controllable. This is readily accomplished by providing for each of the intake ports 30 a needle or like valve 40 for regulating the rate of flow therethrough to the cylinder 9 and thereby regulating the fluid pressure applied to each end of the actuating piston.

Insertible into the housing 8 through the ends of their respective cylinders when the latter are exposed by removal of one of the end plates 13, the pistons 3, 5 and 7 may be of one-piece construction with fluid leakage around them from the related cylinders prevented by O- or like piston rings 41 carried by the pistons. However, the slide valve 4, at least in the preferred embodiment, is of multi-piece construction to permit insertion and removal of its springs 27 and washers 29, the pieces of the valve, while normally pinned or otherwise secured together, being separable either between the central portion 22 and outer portions 23 of the stem 21 or between the latter and the head 20. Having a sliding fit with its chambered cylinder 10, the slide valve is guided against rotation to ensure proper alignment of its passages 32 with the associated ports 30 and 31 and the passages 34 by its pin and slot connection 17 with the shifting piston 5.

Constructed in the above manner, the valve operating mechanism 2 provides, in its timed reversible linearly or reciprocably movable actuating piston 3, an instrumentality for automatically operating a fluid regulating or control valve through a suitable mechanical connection or linkage. The operating mechanism 2 thus may be applied to practically any type of regulating or control valve, whether the latter is seated and unseated through a rotary or linear motion. However, in the preferred embodiment, in which the valve 1 and operating mechanism 2 are designed for installation as an assembly or unit in a fluid conducting pipe or conduit (not shown), the control valve 1 is a rotary, or more specifically, a butterfly valve.

Mounted in a casing 42 insertible between adjoining sections of pipe (not shown) and having a substantially cylindrical axial bore 43 of an inside diameter suitable for the pipe, the butterfly valve 1 has a valve disc 44 carrying in a peripheral groove 45 an O- or like ring 46 for engagement with the inner wall 47 of the casing 42. The valve disc 44 in the usual manner is designed to be rotated between open position in which it lies in a plane substantially parallel to the axis of the bore 43 and closed position in which it is disposed substantially perpendicular to that axis. Such rotatable mounting is here obtained through a pair of trunnions, stub axles or shafts 48 extending or outstanding from diametrically opposite sides of the disc 44 and journalled in fluid-tight bearings 49 integral with the casing. Application of the disc 44 is facilitated by bifurcating the inner portions of the trunnions 48 to receive the disc, edge-wise, and removably securing each trunnion to the disc by a screw or like means 50.

Since the butterfly valve is rotatable between open and closed positions, it is only necessary to provide a mechanical connection between one of the trunnions 48 and the actuating piston 3 by which the reciprocable motion of the piston will be translated into rotary motion, which opens the valve at one limit of movement and closes it at the other, for the valve to be opened and closed automatically and remain in each of these positions for an interval or period determined by the time-setting of the control mechanism 2. This is readily accomplished in the preferred embodiment by an intermeshing rack 51 and pinion 52 of the required gear ratio, the rack 51 being a circular one formed on the stem 53 of the actuating piston 31 intermediate its ends and the pinion being carried by and fixed to the inner end of one of the trunnions 48. For normally holding the rack 51 and pinion 52 in intermeshing relation, the housing 8 is connected to the side of the casing 42 from which the pinion-carrying of the trunnions 48 projects as by bolts 54 extending through outstanding flanges 55 at the inner ends of the housing and threaded into wings or lugs 56 outstanding from the casing at opposite sides of that trunnion. The bolts 54 also serve to hold the intake ports 30 in the housing in alignment with extensions thereof which extend through the wings 55 and open onto the inner wall 47 of the casing on the upstream side of the valve disc 44.

With the limits of movement of the actuating piston 3 under force of line pressure now translated into rotary movement of the butterfly valve 1 to open or closed position, the butterfly valve, once the automatic valve assembly is installed in a fluid line, will intermittently or periodically be opened and closed for intervals determined by the setting of the timing device 6 in the control mechanism and at a rate of movement in opening and closing determined by the setting of the valves 40 in the intake ports 30. It should be understood that the described and disclosed embodiment is merely exemplary of the invention and that all modifications are intended to be included which do not depart from either the spirit of the invention or the scope of the appended claims.

Having described my invention, I claim:

1. An automatic valve comprising a control valve disposable in a fluid line for regulating flow of fluid therethrough, valve operating mechanism including an actuating element reversibly movable in a fixed path in response to pressure thereon of said fluid, means for controlling the direction of movement of said actuating element including a pilot valve shiftable into a plurality of positions, means movable in response to the pressure of said fluid for shifting said pilot valve into said positions, means connected for movement therewith to said shifting means for predetermining the intervals at which said pilot valve is shifted, and means for transmitting said movement of said actuating element to said control valve and regulating flow through said line.

2. An automatic valve comprising a control valve disposable in a fluid line for regulating flow of fluid therethrough, valve operating mechanism including an actuating element reversibly movable in a fixed path in response to pressure thereon of said fluid, means for controlling the direction of movement of said actuating element including a pilot valve shiftable into a plurality of positions, means movable in response to the pressure of said fluid for shifting said pilot valve into said positions, means connected for movement therewith to said shifting means for predetermining the intervals at which said pilot valve is shifted, and a mechanical connection between said actuating element and control valve for transmitting movement of said element to said control valve and correspondingly regulating flow of fluid through said line.

3. An automatic valve comprising a casing connectable in a fluid line, a control valve in said casing, an operating mechanism connected to said casing, said mechanism including an actuating element reversibly movable in a fixed path in response to pressure thereon of said fluid, means for controlling the direction of movement of said actuating element including a pilot valve shiftable into a plurality of positions, means movable in response to the pressure of said fluid for shifting said pilot valve into said positions, means connected for movement therewith to said shifting means for predetermining the intervals at which said pilot valve is shifted, and a mechanical connection between said actuating element and control valve for transmitting movement of said element to said control valve and correspondingly regulating flow of fluid through said line.

4. An automatic valve comprising a casing connectable in a fluid line, a control valve in said casing, an operating mechanism connected to said casing, said mechanism including a housing connected to said casing, an actuating piston reciprocable in a cylinder in said housing, a pilot valve shiftable into a plurality of positions for alternately connecting opposite ends of said cylinder to atmosphere and through means in said housing and casing to line pressure of said fluid and thereby reciprocating said piston, means movable in response to the pressure of said fluid for shifting said pilot valve into said positions, means connected for movement therewith to said shifting means for predetermining the intervals at which said pilot valve is shifted, and a mechanical connection between said actuating element and control valve for transmitting movement of said element to said control valve and correspondingly regulating flow of fluid through said line.

5. An automatic valve comprising a control valve disposable in a fluid line for regulating flow of fluid therethrough, valve operating mechanism including an actuating element reversibly movable in a fixed path in response to pressure thereon of said fluid, means for controlling the direction of movement of said actuating element including a pilot valve shiftable into a plurality of positions, means movable in response to the pressure of said fluid for shifting said pilot valve into said positions, means movable in unison with said shifting means against resistance of fluid in a closed circuit for predetermining the intervals at which said pilot valve is shifted, and means for transmitting said movement of said actuating element to said control valve and regulating flow through said line.

6. An automatic valve comprising a casing having an axial bore and insertible in a pipeline between adjoining sections of pipe, a butterfly valve rotatably mounted in said casing and having a trunnion extending therethrough at one side thereof, a housing removably attached to said one side of said casing, an actuating piston reciprocable in a cylinder in said housing, each end of said cylinder being fluid-connected to a vent and through said housing and casing to pressure of fluid in said pipeline upstream of said butterfly valve, a pilot valve interposed in said fluid connections and shiftable in position for controlling the direction of movement of said actuating piston in response to the pressure of said fluid, means responsive to said pressure for shifting the position of said pilot valve, means movable in unison with said shifting means against resistance of a fluid in a closed circuit for predetermining the intervals at which said pilot valve is shifted, and a rack on said actuating piston and engageable with a pinion carried by said trunnion for converting the timed reciprocable movement of said actuating piston to timed opening and closing of said butterfly valve.

7. An automatic valve comprising a casing having an axial bore and insertible in a pipeline between adjoining sections of pipe, a butterfly valve having a valve disc and a pair of diametrically opposed trunnions, said trunnions being removably attached to said disc and journalled in bearings integral with and at opposite sides of said casing, a housing removably attached to one of said sides of said casing, an actuating piston reciprocable in a cylinder in said casing substantially normal to the adjoining of said trunnions, each end of said cylinder being fluid-connected to a vent and through said housing and casing to pressure of fluid in said pipeline upstream of said butterfly valve, a pilot valve interposed in said fluid connections and shiftable in position for controlling the direction of movement of said actuating piston in response to the pressure of said fluid, means responsive to said pressure for shifting the position of said pilot valve, means movable in unison with said shifting means against regulatable resistance of a fluid in a closed circuit for predetermining the intervals at which said pilot valve is shifted, and a rack on said actuating piston and engageable with a pinion carried by said adjoining trunnion for converting the timed reciprocable movement of said actuating piston to timed opening and closing of said butterfly valve.

8. Valve operating mechanism for an automatic valve, comprising a housing having a plurality of spaced substantially parallel cylinders extending therethrough, end plates normally closing opposite ends of said cylinders, an actuating piston in one of said cylinders, a shifting piston in another of said cylinders, fluid connections for connecting corresponding ends of said actuating and shifting piston cylinders in common to atmosphere and to line pressure of a fluid controlled by said automatic valve, a shiftable pilot valve interposed in said fluid connections and connected to said shifting piston for shifting thereby for controlling the direction of movement of said actuating and shifting pistons in response to fluid pressure, and a timing piston in another of said cylinders and connected for movement in unison to said shifting piston, said timing piston acting against a fluid in and regulatable in flow between opposite ends of the timing piston cylinder for predetermining the intervals at which said pilot valve is shifted.

9. Valve operating mechanism for an automatic valve, comprising a housing having a plurality of spaced substantially parallel cylinders extending therethrough, end plates normally closing opposite ends of said cylinders, an actuating piston in one of said cylinders, a shifting piston in another of said cylinders, fluid connections for connecting corresponding ends of said actuating and shifting piston cylinders in common to atmosphere and to line pressure of a fluid controlled by said automatic valve, a pilot valve interposed in said fluid connections and shiftable in position by said shifting piston for controlling the direction of movement of said actuating and shifting pistons in response to fluid pressure, a lost motion connection between said pilot valve and shifting piston for shifting said pilot valve on a predetermined movement of said shifting piston, and a timing piston in another of said cylinders and connected for movement in unison to said shifting piston, said timing piston acting against a fluid in and regulatable in flow between opposite ends of the timing piston cylinder for predetermining the intervals at which said pilot valve is shifted.

10. Valve operating mechanism for an automatic valve, comprising a housing having a plurality of spaced substantially parallel cylinders extending therethrough, end plates normally closing opposite ends of said cylinders, an actuating piston in one of said cylinders, a shifting piston in another of said cylinders, fluid connections for connecting corresponding ends of said actuating and shifting piston cylinders in common to atmosphere and to line pressure of a fluid controlled by said automatic valve, a shiftable pilot valve interposed in said fluid connections and connected to said shifting piston for shifting thereby for controlling the direction of movement of said actuating and shifting pistons in response to fluid pressure, a timing piston in another of said cylinders and connected for movement in unison with said shifting piston, piping connecting opposite ends of said timing piston cylinder for transferring a fluid contained in said ends from one to the other thereof, and needle valve means in said piping for controlling the rate of transfer between said ends of said fluid in said timing piston cylinder and thereby regulating the intervals at which said pilot valve will be shifted by said shifting piston.

11. Valve operating mechanism for an automatic valve, comprising an actuating element reversibly movable in a fixed path in response to pressure of the fluid regulated by said automatic valve, a shifting element reversibly movable in response to pressure of said fluid and moved thereby in the same direction as said actuating element, means including a shiftable pilot valve for controlling the direction of movement of said actuating and shifting elements in response to said pressure, a lost motion connection between said shifting element and pilot valve for shifting said valve on a predetermined movement of said shifting element, and a fluid pressure timing device having an element connected for movement in unison with said shifting element for retarding movement of said shifting element relative to said actuating element and determining the intervals at which said pilot valve is shifted.

12. Valve operating mechanism for an automatic valve, comprising an actuating element reversibly movable in a fixed path in response to pressure of the fluid regulated by said automatic valve, a shifting element reversibly movable in response to pressure of said fluid and moved thereby in the same direction as said actuating element, means including a shiftable pilot valve for controlling the direction of movement of said actuating and shifting elements in response to said pressure, a lost motion connection between said shifting element and pilot valve for shifting said valve on a predetermined movement of said shifting element, a fluid pressure timing device having an element connected for movement in unison with said shifting element for retarding movement of said shifting element relative to said actuating element and determining the intervals at which said pilot valve is shifted, and valve means for individually regulating the rate of movement of said actuating element in either direction in response to line pressure.

13. Valve operating mechanism for an automatic valve, comprising an actuating element reversibly movable in a fixed path in response to pressure of the fluid regulated by said automatic valve, a shifting element reversibly movable in response to pressure of said fluid and moved thereby in the same direction as said actuating element, means including a shiftable pilot valve for controlling the direction of movement of said actuating and shifting elements in response to said pressure, a lost motion connection between said shifting element and pilot valve for shifting said valve on a predetermined movement of said actuating and shifting element, and a fluid pressure timing device for regulating the intervals at which said pilot valve is shifted by said shifting element, said timing device including a timing piston connected to said shifting element and reciprocable in a cylinder having its ends filled with a fluid, piping connecting said ends of said cylinder for exchange of said fluid therebetween, and needle valve means in said piping for regulating the rate of said exchange.

14. Valve operating mechanism for an automatic valve, comprising an actuating element reversibly movable in a fixed path in response to pressure of the fluid regulated by said automatic valve, a shifting element reversibly movable in response to pressure of said fluid and moved thereby in the same direction as said actuating element, means including a shiftable pilot valve for controlling the direction of movement of said actuating and shifting elements in response to said pressure, a lost motion connection between said shifting element and pilot valve for shifting said valve on a predetermined movement of said shifting element, and a fluid pressure timing device for regulating the intervals at which said pilot valve is shifted by said shifting element, said timing device including a timing piston connected to said shifting element and reciprocable in a cylinder having its ends filled with a fluid, a pair of pipes connecting the ends of said cylinder for exchanging fluid therebetween on reciprocation of said piston, a pair of oppositely facing one-way valves one in each of said pipes, and a needle valve in each of said pipes for individually regulating the rate of movement of said piston in each direction and correspondingly varying the intervals at which said pilot valve is shifted.

References Cited in the file of this patent
UNITED STATES PATENTS

| | | |
|---|---|---|
| 585,377 | Craig | June 29, 1897 |
| 849,105 | Brooks | Apr. 2, 1907 |
| 987,048 | Connet | Mar. 14, 1911 |
| 1,920,003 | Chenault | July 25, 1933 |
| 2,605,079 | Miller | July 29, 1952 |
| 2,619,105 | Hauser | Nov. 25, 1952 |